US010191955B2

(12) United States Patent
Hade et al.

(10) Patent No.: US 10,191,955 B2
(45) Date of Patent: Jan. 29, 2019

(54) DETECTION AND VISUALIZATION OF SCHEMA-LESS DATA

(71) Applicant: Microsoft Technology Licensing, LLC, Redmond, WA (US)

(72) Inventors: Merwan Vishnu Hade, Bellevue, WA (US); Paul Yuknewicz, Redmond, WA (US); Dennis Angeline, Snohomish, WA (US); Huan Guo, Redmond, WA (US); Mine Tanrinian Demir, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 311 days.

(21) Appl. No.: 13/801,904

(22) Filed: Mar. 13, 2013

(65) Prior Publication Data

US 2014/0280139 A1    Sep. 18, 2014

(51) Int. Cl.
*G06F 17/30* (2006.01)

(52) U.S. Cl.
CPC .. *G06F 17/30572* (2013.01); *G06F 17/30011* (2013.01); *G06F 17/30309* (2013.01); *G06F 17/30595* (2013.01)

(58) Field of Classification Search
CPC .................................................. G06F 17/30705
See application file for complete search history.

(56) References Cited

U.S. PATENT DOCUMENTS

| 7,251,693 | B2 * | 7/2007 | Stull et al. ............... 709/225 |
| 7,856,370 | B2 | 12/2010 | Katta et al. |
| 8,612,887 | B2 * | 12/2013 | Doney et al. .............. 715/810 |
| 2003/0204511 | A1 | 10/2003 | Brundage et al. |
| 2003/0220747 | A1 | 11/2003 | Vailaya et al. |
| 2007/0124318 | A1 | 5/2007 | Leung |
| 2008/0133553 | A1 | 6/2008 | Kitsis et al. |
| 2009/0141741 | A1 * | 6/2009 | Kim ............. H04L 29/12943 370/474 |
| 2010/0194778 | A1 * | 8/2010 | Robertson et al. ......... 345/619 |
| 2010/0299332 | A1 * | 11/2010 | Dassas et al. ............. 707/741 |
| 2011/0099515 | A1 | 4/2011 | Doney et al. |
| 2011/0225167 | A1 | 9/2011 | Bhattacharjee et al. |

(Continued)

FOREIGN PATENT DOCUMENTS

CN          101263476 A       9/2008

OTHER PUBLICATIONS

Evers, Martijn, "Colors of the Data Vault," Data Matters (Unseen), Blog (downloaded from: http://dm-unseen.blogspot.in/2012/11/colors-of-data-vault.html), Nov. 20, 2012, (4 pages).

(Continued)

*Primary Examiner* — Mohammad S Rostami
(74) *Attorney, Agent, or Firm* — Workman Nydegger

(57) ABSTRACT

Embodiments provide a viewer/editor for schema-less data, such as a NoSQL database. The data structures are displayed so that each entity type in the data uses a different color and variable column widths. This allows the user to identify relationships between entities. For a selected entity, only the properties applicable to that entity are displayed by the viewer/editor. The column width for each property is optimized to reduce confusion and to allow the user to focus on the selected data.

17 Claims, 8 Drawing Sheets

| 100 | Key | FirstName | LastName | OrderDate | OrderTotal | Address | Email | |
|---|---|---|---|---|---|---|---|---|
| | Key1 | FN1 | LN1 | | | | Email1 | 101 |
| | Key2 | FN2 | LN2 | | | | Email2 | 102 |
| | Key3 | FN3 | LN3 | | | | Email3 | 103 |
| | Key4 | | | Date1 | Total1 | Address1 | | 104 |
| | Key5 | | | Date2 | Total2 | Address2 | | 105 |
| | Key6 | FN4 | LN4 | | | | Email4 | 106 |
| | Key7 | FN5 | LN5 | | | | Email5 | 107 |
| | Key8 | | | Date3 | Total3 | Address3 | | 108 |
| | Key9 | | | Date4 | Total4 | Address4 | | 109 |
| | Key10 | | | Date5 | Total5 | | | 110 |
| | Key11 | FN6 | LN6 | | | | Email6 | 111 |

(56) References Cited

U.S. PATENT DOCUMENTS

| | | | |
|---|---|---|---|
| 2012/0060142 A1* | 3/2012 | Fliess | G06F 8/70 717/102 |
| 2012/0117500 A1* | 5/2012 | Maim | G06F 17/246 715/769 |
| 2012/0144416 A1 | 6/2012 | Wetzer et al. | |
| 2012/0166400 A1* | 6/2012 | Sinclair | G06F 17/30315 707/692 |
| 2012/0166402 A1* | 6/2012 | Pederson | G06F 17/30486 707/692 |
| 2013/0282765 A1* | 10/2013 | Bhattacharjee | G06F 17/30292 707/803 |
| 2013/0339311 A1* | 12/2013 | Ferrari | G06Q 30/0627 707/687 |

OTHER PUBLICATIONS

Suvee, Davy, "Circos: An Amazing Tool for Visualizing Big Data," DZone (downloaded from: http://architects.dzone.com/news/circle-through-your-google), Mar. 13, 2012, (7 pages).

Cammarano, Mike, "Visualization of Heterogeneous Data," Proceedings: IEEE Transactions on Visualization and Computer Graphics, Mar. 31, 2007, (8 pages).

Unknown, "3D Repo Runs MongoDB," The MongoDB NoSQL Database Blog, (downloaded from: http://blog.mongodb.org/), Dec. 18, 2012, (32 pages).

Microsoft, "Understanding the Table Service Data Model," (downloaded from: msdn.microsoft.com/en-us/library/windowsazure/dd179338.aspx, 2012, (6 pages).

"International Search Report & Written Opinion for PCT Patent Application No. PCT/US2014/020449", dated Sep. 30, 2014, 9 Pages.

"Supplementary European Search Report," issued in European Patent Application No. 14712901.9, dated Sep. 16, 2016, 12 Pages.

"Office Action Issued in European Patent Application No. 14712901.9", dated Aug. 21, 2017, 8 Pages.

"First Office Action and Search Report Issued in Chinese Patent Application No. 201480014383.6", dated Jan. 10, 2018, 13 Pages.

"Second Office Action Issued in Chinese Patent Application No. 201480014383.6", dated Jul. 25, 2018, 9 Pages.

* cited by examiner

| Type | Key | FirstName | LastName | OrderDate | OrderTotal | Address | Email |
|---|---|---|---|---|---|---|---|
| Type 1 | Key 1 | John | Adams | | | | johnadams@ |
| Type 2 | Key 2 | Thomas | Jefferson | | | | thomas.jeffer |
| Type 3 | Key 3 | Aaron | Burr | | | | aburr@aol.co |
| Type 5 | Key 5 | | | 2012-01-11 | 1531.97 | 1010 Colorac | |
| Type 5 | Key 5 | | | 2012-10-31 | 2037.38 | P.O. Box 112 | |
| Type 6 | Key 6 | George | Clinton | | | | georgec@gr |
| Type 7 | Key 7 | ElbrKeyge | Gerry | | | | gerrymander |
| Type 8 | Key 8 | | | 2012-06-15 | 2285.29 | 533 Lincoln S | |
| Type 9 | Key 9 | | | 2012-07-05 | 3701.55 | 510 E. Jacks | |
| Type 10 | Key 10 | | | 2012-05-27 | 789.53 | | |
| Tpe 11 | Key 11 | Daniel | Tompkins | | | | ddTompkins( |

Entity Type 1    Entity Type 2    Entity Type 3

*FIG. 5*

| Type | Key | FirstName | LastName | Email | |
|---|---|---|---|---|---|
| Type 1 | Key 1 | John | Adams | johnadams@msn.com | ← 602 |
| Type 2 | Key 2 | Thomas | Jefferson | thomas.jefferson@hotmail.com | ⎫ 603 |
| Type 3 | Key 3 | Aaron | Burr | aburr@aol.com | ⎭ |
| Type 4 | Key 4 | 2012-01-11 | 1431.97 | 1010 Colorado St., Austin, Texas, 78701 | ⎫ 604 |
| Type 5 | Key 5 | 2012-10-31 | 2037.38 | P.O. Box 11207, Olympia, WA 98608-1207 | ⎭ |
| ▶ Type 6 | Key 6 | George | Clinton | georgec@gmail.com | ← 601 |
| Type 7 | Key 7 | Elbridge | Gerry | gerrymander@mass.gov | ← 603 |
| Type 8 | Key 8 | 2012-06-14 | 2284.29 | 533 Lincoln St. S., Salem, Oregon 97302 | ⎫ 604 |
| Type 9 | Key 9 | 2012-07-04 | 3701.65 | 410 E. Jackson, Springfield, Illinois 62701 | ⎭ |
| Type 10 | Key 10 | 2012-04-27 | 789.43 | ← 605 | |
| Type 11 | Key 11 | Daniel | Tompkins | ddTompkins@yahoo.com | ← 603 |

▨ Entity Type 1  ▦ Entity Type 2  ▩ Entity Type 3

*FIG. 6A*

| Type | Key | OrderDate | Total | Address | |
|---|---|---|---|---|---|
| Type 1 | Key 1 | John | Adams | johnadams@msn.com | ← 652 |
| Type 2 | Key 2 | Thomas | Jefferson | thomas.jefferson@hotmail.com | ⎫ 654 |
| Type 3 | Key 3 | Aaron | Burr | aburr@aol.com | ⎭ |
| Type 4 | Key 4 | 2012-01-11 | 1431.97 | 1010 Colorado St., Austin, Texas, 78701 | ⎫ 653 |
| Type 5 | Key 5 | 2012-10-31 | 2037.38 | P.O. Box 11207, Olympia, WA 98608-1207 | ⎭ |
| Type 6 | Key 6 | George | Clinton | georgec@gmail.com | ⎫ 654 |
| Type 7 | Key 7 | Elbridge | Gerry | gerrymander@mass.gov | ⎭ |
| ▶ Type 8 | Key 8 | 2012-06-14 | 2284.29 | 533 Lincoln St. S., Salem, Oregon 97302 | ← 651 |
| Type 9 | Key 9 | 2012-07-04 | 3701.65 | 410 E. Jackson, Springfield, Illinois 62701 | ← 653 |
| Type 10 | Key 10 | 2012-04-27 | 789.43 | ← 605 | |
| Type 11 | Key 11 | Daniel | Tompkins | ddTompkins@yahoo.com | ← 654 |

▨ Entity Type 1  ▦ Entity Type 2  ▩ Entity Type 3

*FIG. 6B*

DETECTION AND VISUALIZATION OF SCHEMA-LESS DATA

BACKGROUND

Traditional Structured Query Language (SQL) databases use unique tables to represent and describe data structures in relational database management systems. While SQL tables are very organized and uniform, next-generation databases are being developed that are non-relational and schema-free, such as Not Only SQL (NoSQL) databases, that have heterogeneous data structures in a single table.

NoSQL databases have emerged as cost-effective solutions for very large data sets. The heterogeneous, loosely structured nature of table row data in NoSQL databases complicates common database development tasks, such as data analysis and semantic error detection. One problem with existing tools for viewing and editing NoSQL databases is the lack of a way to distinguish between different entity types. Due to the volume (e.g., number of rows) and width of data (e.g., number of columns) described, it can be difficult to differentiate between semantically distinct data rows within a single table. For example, a NoSQL table may encapsulate two or more distinct data structures where each data structure has its own columns. Existing development tools cannot differentiate semantically distinct row data based on their column values. As a result, development tasks, such as analysis and error detection for NoSQL and other schema-less data, can be a considerable challenge in non-relational and schema-free databases.

Another problem with existing NoSQL databases is that the data is spread out so that it is difficult to see all of the data for a given entity on one screen. Many of the columns for a given row will be blank because those columns or properties are associated with other data structures in the same table. As a result, the user has to scroll horizontally through the database to see all of the properties for a selected row.

An additional problem caused by these blank cells is the creation of a lot of "white space" (i.e., unused or unneeded space) in the table. It can be difficult to visualize the state and meaning of a row representing a selected data structure if columns for other data structures are interspersed with the columns for the selected data structure. Large gaps between the properties for a given row make it difficult for the user to scan the table.

A further problem with the display of existing NoSQL databases is the use of uniform column widths regardless of the amount of space required by the property associated with each column. A property requiring few pixels (e.g., 1-10 characters) is assigned the same space as a property requiring very many pixels (e.g., 100+ characters). As a result, additional white space is added to the shorter property, and the longer property is likely only partially displayed, which may render it unreadable.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments provide a viewer/editor for schema-less data, such as a NoSQL database. The data structures are displayed so that each entity type in the data uses a different color and variable column widths. This allows the user to identify relationships between entities. For a selected entity, only the properties applicable to that entity are displayed by the viewer/editor. In addition to distinguishing between entity types so that the user can focus on selected data, the invention optimizes the column width of the display so that the user can see as much information as possible.

When a NoSQL database is selected, a detector analyzes the data row-by-row and identifies one or more entity types represented by the data. Each row is assigned to a particular entity type. The detector further determines an optimum column width for the data in each entity type. The database table is opened in a viewer/editor that assigns each row a color based upon its entity type. The viewer/editor removes unused properties from each row and displays the data using an optimized column width for each property. When a user selects a row, a header row is displayed using the appropriate properties for the selected row.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 illustrates a schema-less database table, such as a NoSQL table, that combines both customer and order information.

FIG. 3 illustrates table after a detector has identified the entity types used in the database according to one embodiment.

FIG. 5 illustrates a modified table 400 in which the columns have been assigned a uniform width as is common in existing database viewers and editors.

FIG. 6A illustrates a compressed view that is displayed by the viewer/editor when a first entity type is selected.

FIG. 6B illustrates a compressed view that is displayed by the viewer/editor when a second entity type is selected.

DETAILED DESCRIPTION

FIG. 1 illustrates a schema-less database table 100, such as a NoSQL table that combines both customer and order information, before the database has been processed. In a SQL embodiment, two separate tables would be used for this data. Table 1 includes a Key column, customer data columns for first name, last name, and email address, and order data columns for order date, order total and shipping address.

The presence or absence of one or more cell values may indicate a given row's data structure or schema and its intended semantics. For example, in table 100 rows representing Customers will include values for the FirstName, LastName, and Email columns, but will not include values for the OrderDate, OrderTotal, and Address columns. On the other hand, rows representing Orders will include values for the OrderDate, OrderTotal, and Address columns, will have no value for the FirstName, LastName, and Email columns.

In this simple example table 100, there are two entity types—customer and order—and only a few columns or properties for each entity type. However, it is likely that working tables will have additional data structures, such as employee, product, and billing data for this example. Also, each entity is likely to have more properties, which would require additional columns, such as additional columns for customer address, phone, gender, order history, and the like for this example. For each data structure, many of the columns will be blank because they are associated with other data structures. This makes it extremely difficult to visualize the state or meaning of a row representing a customer if the columns for other entities are interspersed with those pertinent to the customer.

Entity Type Detection

Figure 2:
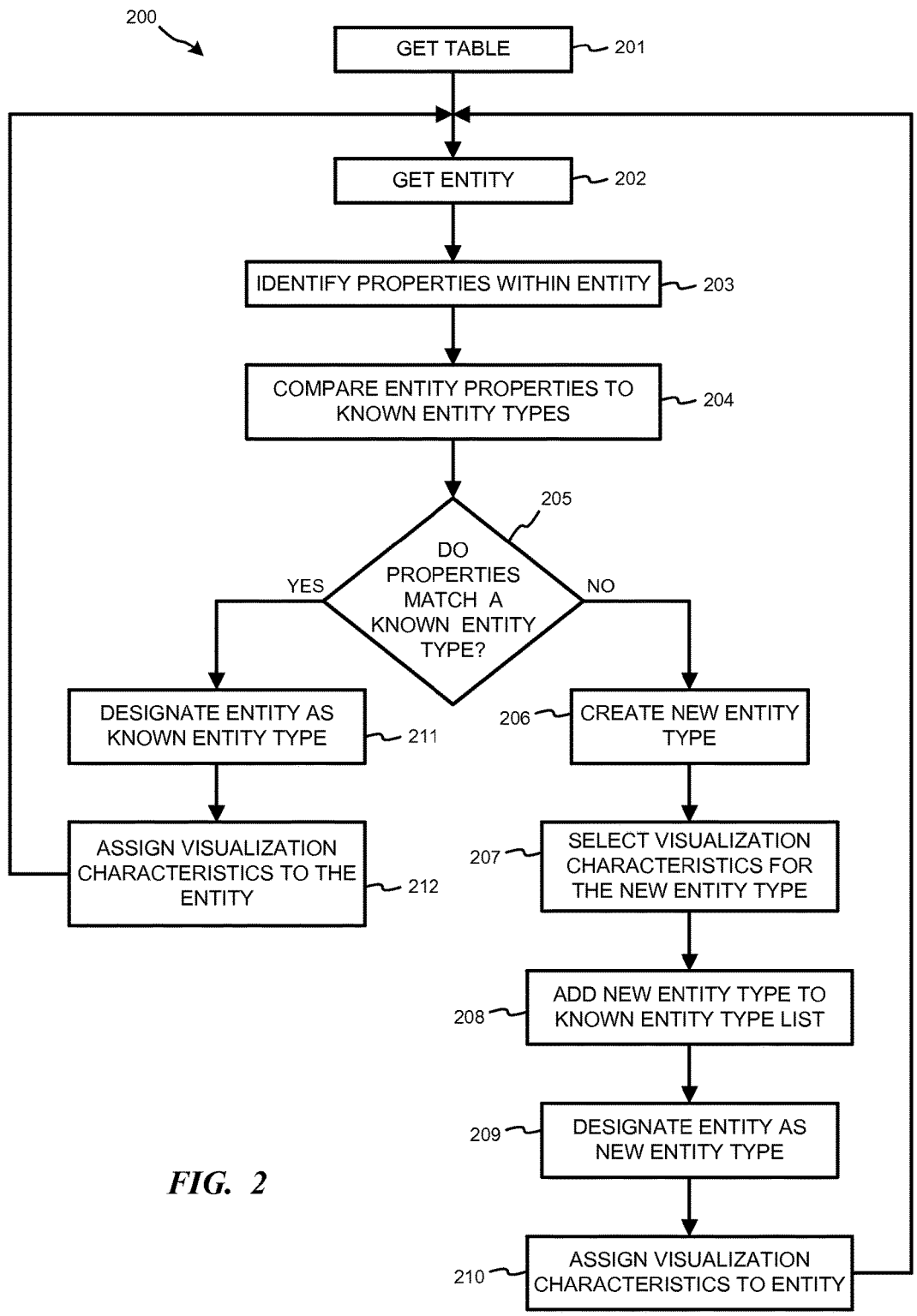
FIG. 2 is a flowchart illustrating a process or method for detecting entity types within a table.

FIG. 2 is a flowchart illustrating a process or method for detecting entity types within a table. In step 201, a detector opens a table selected by a user. In step 202, the detector gets an entity from the table. In step 203, the detector identifies properties within the selected entity. For example, each row in the table may be a separate entity and the columns in the table may represent different properties. In step 204, the detector compares the entity properties to a list of known entity types. The known entity types may correspond to previously identified entity types within the current table or a predefined set of entity types.

In step 205, the detector determines if the entity properties matches any of the known entity types. The matching process may operate under varying degrees of strictness. For example, an exact match may be required (e.g., identical properties arranged in the same order), or the detector may require some less strict overlap (e.g., a threshold percentage or minimum number of matching properties, or the properties appearing in any order).

If the entity properties do not match any known entity type in step 205, then the process moves to step 206 where the detector creates a new entity type. In step 207, the detector selects visualization properties for the new entity type. The visualization characteristics may be a color, for example, that is used to indicate the entity type for each entity in the table. In step 208, the detector adds the new entity type to the list of known entity types used above in step 204. In step 209, the detector then designates the selected entity as the new entity type and, in step 210, assigns the visualization characteristics to the entity. The process then returns to step 202 to select a next entity in the table.

Table 300 of FIG. 3 illustrates certain modifications to table 100 (FIG. 1) after a detector has identified the entity type for each entity in the table, such as by applying process 200 (FIG. 2). The entity type detector determines the entity type for each row before the table is displayed to the user. The detector selects table 100 (step 201) and then gets a first entity from the table (step 202). The entity may be represented in different ways for different databases. For example, each row or column in a table may be considered as a separate entity. In other embodiments, a group of rows or columns may be designated as a single entity (e.g., a set number of adjacent rows or columns taken together). Further embodiments may treat blocks of cells as separate entities (e.g., the cells from X adjacent columns and Y adjacent rows taken together).

For example, the detector selects row 101 as the first entity and then identifies the entity's properties (step 203) and compares them to properties for known entity types (step 204). If the entity's properties do not match known types (step 205), which would be the case for the first entity in the table, then the detector creates a new entity type (step 206). The detector also selects visualization characteristics for the new entity type (step 207). The information for the new entity type is added to the list of known entities (step 208). The detector then designates the row as entity Type 1 (step 209) and applies the visualization characteristics to the entity (step 210). For example, row 301 in FIG. 3 is designated as entity Type 1 in column 312 and is highlighted with the visualization characteristics of that new entity type.

A new entity type property may be added to each row in the table. Each unique entity type is assigned a different color so that rows of the same type are easily identified in the table. The detector determines entity types for each row based on the properties of an entity. So, after processing row 101/301, the detector continues to the next entity—row 102—and continues identifying entity types. If two entities have the same properties, then those entities are considered to be the same type by the detector. Any entity that has a different set of properties than a previously indexed entity is assigned a different entity type by the detector. Accordingly, the detector will match the properties for row 102 to the properties for entity Type 1 (step 205). The detector will then designate row 102 as entity Type 1 (step 211) and assign row 102 with the characteristics of entity Type 1 (step 212). Table 300 shows row 302 after processing by the detector with entity Type 1 in column 312 and is highlighted with the visualization characteristics of entity Type 1.

The detector continues through the table and identifies the entity type for rows 103-111 and assigns them the appropriate Type (312) and visual characteristics shown in rows 303-311.

In one embodiment, the determination of the entity types may be based upon the name of each property. The property name may be found in a header row, for example. The detector may use varying degrees of strictness when matching property names. For example, the detector may or may not consider the capitalization, spelling, punctuation, and font of the property name when comparing two properties.

In addition to using property names, the detector may use the data type for each property (e.g., Boolean, string, integer, or any other data type assigned to the property) to identify and distinguish entity types. For example, if two properties have the same name, then the entity types for those properties could be distinguished from each other by looking at the data type of each property. For example, if a table includes one column labeled "gender" with a string data type (e.g., populated with the values "male" or "female") and another column also labeled "gender" but with an integer data type (e.g., populated with "0" for males and "1" for females), then the data type for each property can be used to further distinguish beyond the name of the property. In a database that does not have named properties (i.e., no header row or column names), the data types of the properties or columns may be used to detect separate entity types.

In other embodiments, in addition to using property names, the detector may consider the order of properties to determine entity type. For example, two separate entity types may have the similarly named properties; however, these properties may have been entered at different times or may have originated from different sources. The order of the properties as they appear in the table may be used to distinguish between the entity types. Alternatively or additionally, the order in which the properties were added to the table or were collected may be used to determine the entity type.

The presence of null values versus non-null values may also be used to determine entity types. Null values may be treated as if the property exists in the entity in one embodiment, but in other embodiments null values are treated as if the entity does not have the property. Depending upon whether or not the null value is considered to be part of the entity, the detector determines how to assign an entity type to that entity.

Entity Type Visualization

Referring to table 100, row 101 has the properties: Key, FirstName, LastName, and Email. This entity is marked as entity type one by the detector and is assigned a unique color. Row 101 will be displayed by a viewer/editor with the unique color as shown in FIG. 3. Rows 102 and 103 have the same properties as row 101 and, therefore, they are also designated as entity type one by the detector and are assigned the same color as row 101. It will be understood that the unique color for an entity may additionally or alternatively include a unique font, highlight, border, shading, or other unique display feature or characteristic.

The detector analyzes row 104 next and identifies the properties: Key, OrderDate, OrderTotal, and Address. This entity is marked as a new entity type—entity type two—and it is assigned a new unique color as shown in FIG. 3.

Proceeding through the table, the detector assigns each row to an existing or new entity type and assigns the appropriate color for that entity type. As a result, in table 300, rows 101-103, 106, 107, and 111 are designated as entity type one and are assigned the shading appropriate for entity type one. Rows 104, 105, 108, and 109 are designated as entity type two and are assigned the shading appropriate for entity type two.

Row 110 includes the properties: Key, OrderDate, and OrderTotal. While this group of properties is similar to entity type two, it is missing the Address property and, therefore, is designated as entity type three with its own unique color as shown in FIG. 3.

Once all of the rows have been designated as the appropriate entity type by the detector, at runtime a viewer/editor displays the table and the assigned colors so that the user can easily identify the different data structures that are supported by table 100. This also allows the user to more easily review and analyze the data for the different entities. The entity Type property 312 may also be displayed to the user, which allows the user to filter and sort the data by entity type.

The entity Type property 312 may be any designation, such as a word or text as shown in FIG. 3. In other embodiments, the entity Type property 312 may be some other label, icon, or shape. The entity Type property 312 may be the only distinguishing feature for some embodiments or for some users. On a monochrome or low-resolution display, color and highlighting may not be available to designate and distinguish between each entity type. In another scenario, users who are color-blind or otherwise sight-impaired may not find color or highlighting to be a useful designation for each entity type. Instead, in these scenarios, the entity Type property 312 may be used to distinguish between entity types. For example, if the entity Type property 312 was a star shape or icon for entity type 1 and a square shape or icon for entity type 2, the user could easily identify different entity types by scanning the entity Type property column.

A user may determine that this new entity type 3 was created solely as a result of missing data in the Address field—i.e. otherwise row 110 would have been designated as and colored like entity type two. In one embodiment, the user may manually re-designate row 110 as entity type two so that it appears like the other Order data. In other embodiments, the detection algorithm may allow for variations in the properties required by a given entity type. For example, the user may identify a particular property that can be ignored when distinguishing between entity types. As a result, it would not matter whether or not that property is present in an entity when determining the entity type. In other embodiments, the entity type detection may not require an exact property match, but may consider two entities to be of the same type if they have at least a threshold number or percentage of overlapping properties.

In other embodiments, the designation of new entity type three may alert the user to other issues, such as, for example, a data-collection problem. The Address field in row 110 may be missing due to an incomplete order form, broken order web page link, or an untrained employee. Therefore, the designation of a separate entity type three may provide useful information for the user to investigate or otherwise act upon.

For purposes of illustration, tables 100 and 300 are shown with dummy data in the properties for each entity type. This dummy data is displayed in FIG. 3 using a uniform length across each individual property. In a practical application, however, it is expected that the cells would be filled with data having varying lengths. When the table is displayed, such as on a computer monitor, then the user would likely have to scroll horizontally to see all of the properties for a selected row. This would make it difficult and inconvenient for the user to see all of the data for a selected row or entity. For example, in a table with as many as 255 properties, width optimization helps the user to view a large amount of data for a selected entity or entity type without having to scroll through the entire table to see the data.

Figure 4:
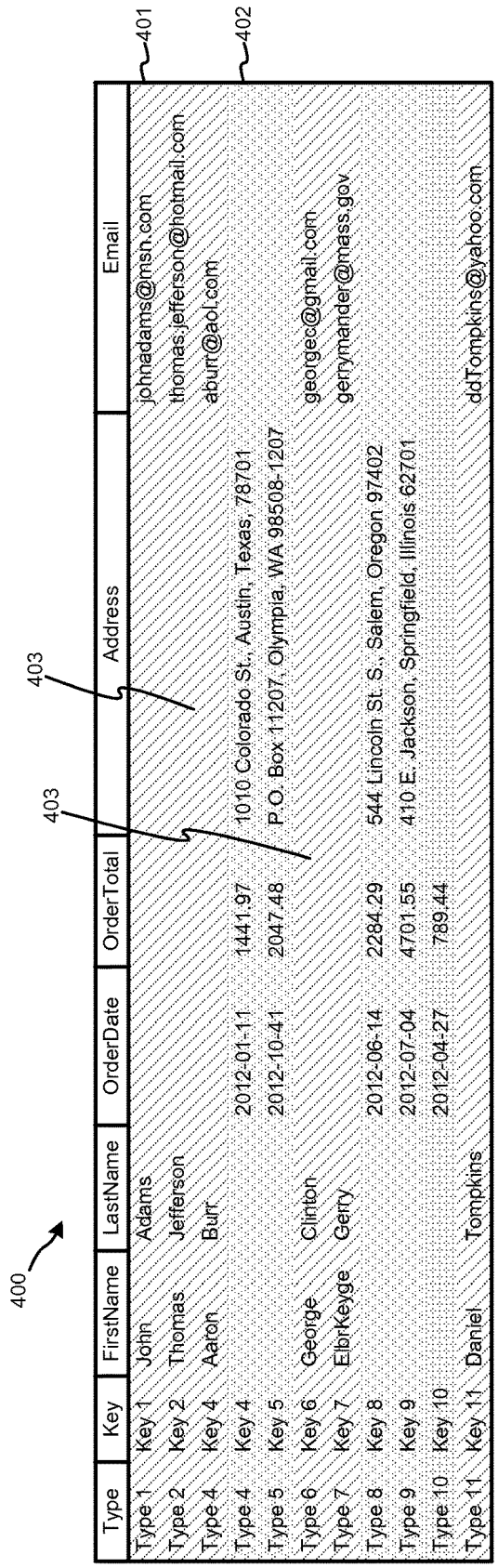
FIG. 4 is an example table having data fields of different widths to accommodate properties for customer and order data structures.

FIG. 4 is an example table 400 having data fields of different widths to accommodate properties for customer and order data structures. A Key property provides a unique identifier for each row. The Key may be, for example, a partition key, row key and/or timestamp. Properties for Customer and Order entities are also shown in table 400. Three entity types are identified in table 400 using different colors or highlighting. However, the data for the entries is spread across the table. Therefore, when the user wants to view all of the information for the customer data in row 401, he or she must scroll horizontally to match the Email field up with the FirstName and LastName fields. Similarly, to match order data with a Key for a selected Order row, such as row 402, the user must also scroll across the table horizontally.

The viewer/editor may have the option of collapsing the displayed columns so that only the properties relevant to a selected entity are shown. This would improve the visual display for the user when viewing tables by removing blank columns or properties, for example. This would also eliminate excessive blank space 403 that is created by areas of empty cells in table 400.

Width Optimization

FIG. 5 illustrates a modified table 500 in which the columns for table 400 (FIG. 4) have been assigned a uniform width as is common in existing database viewers and editors. One problem with this approach are evident in columns 501 and 502 in which the data for the Address and Email properties is too long to be displayed in the assigned space and, therefore, is cut off in the user's display. As a result, the address and email data is unreadable. Another problem is observed in column 503, for example, in which the spaced required for the key data is about half of the assigned space, which adds to the unused white space in table 500.

To address the problems illustrated by the tables shown in FIGS. 3 and 5, the detector adjusts the width of each column to an optimized value. Additionally, the detector compresses the data shown for each entity type so that less unused white space is presented on the display. As a result, the user may easily see all of the data for each entity in the table with little or no scrolling required. An innovation of the detector and viewer/editor described herein is the rejection of uniform column widths. Instead, every entity type and every property in that entity type is given the best possible width.

FIG. 6A illustrates a compressed view 600 that is displayed by the viewer/editor when a first entity type is selected. For example, when row 601 of entity type one is selected in table 600, such as by "clicking" on the row using a mouse or other pointing device, the viewer/editor presents view 600 to the user. The headings in row 602 are simplified to show the properties for entity type one only: Key, FirstName, LastName, and Email. The properties that are used in other entity types only, such as OrderDate, OrderTotal, and Address, are not shown. Header row 602 is also assigned the color or highlighting used in entity type one. The fields in the columns of the selected row 601, header row 602, and other entity type one rows 603 are compressed together so that no blank columns appear in the rows for the selected entity type.

Although the rows for a selected entity type may be compressed to improve the display, rows corresponding to other entity types (i.e., non-selected rows) may or may not be compressed. The properties for the non-selected entity types are not shown in the header row 602. The rows for non-selected entity types are further distinguished by their assigned color or highlighting or with another unique identifier.

FIG. 6B illustrates a compressed view 650 that is displayed by the viewer/editor when a second entity type is selected. View 650 is similar to view 600 (FIG. 6A), but the header row has changed to reflect the currently selected entity type. For example, when row 651 of entity type two is selected, the viewer/editor presents view 650 to the user. The headings in row 652 are simplified to just show the properties for entity type two: Key, OrderDate, OrderTotal, and Address. The properties that are only used in other entity types, such as FirstName, LastName, and Email, are not shown. Header row 652 is also assigned the color or highlighting used in entity type two. The fields in the columns of the selected row 651, header row 652, and other entity type two rows 653 are compressed together so that no blank columns appear in the rows for the selected entity type.

The rows for other entity types, such as rows 654 for entity type one and row 605 for entity type three, are also compressed, in one embodiment, but the properties for these rows are not shown in the header row 602. The rows 654, 605 for non-selected entity types are still shown in their assigned color or highlighting.

Figure 7:
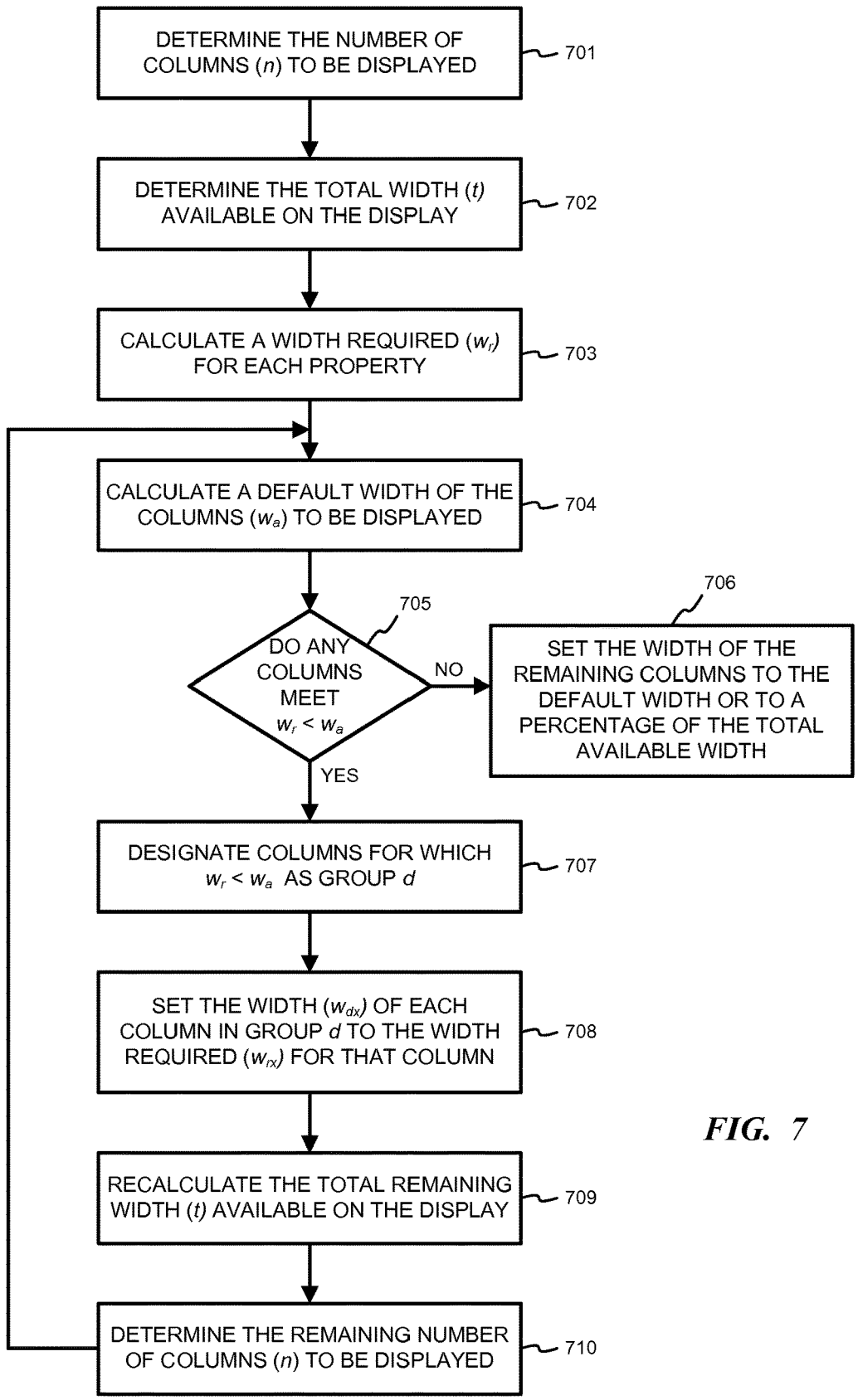
FIG. 7 illustrates a process used in one embodiment to determine column widths to be displayed for a selected entity type.

FIG. 7 is a flowchart illustrating a process or method that may be used in one embodiment to determine column widths used for displaying entity in the table. The table display— i.e., the assigned column widths and data in the entities— may be different than the viewable area on a display. For example, after a large table is optimized for viewing, the columns may not all fit in the display space (e.g., all or part of the display screen) designated for viewing the table may not be large enough to fit the entire optimized table. Rather than over-compress the table data to fit the available viewing area, the user may have to scroll horizontally through the optimized table to see all of the data for each entity. However, because the table display has been optimized, the user will have much less scrolling than required for existing, non-optimized tables.

In step 701, the number of columns to be displayed n is determined. Initially, the value of n is the total number of properties for the entity type. In step 702, the total width available on the display is determined. The total width t may correspond to the entire screen width or may be a window, box, or other designated section of the display. The value of t depends on the width of the overall application window for the viewer/editor and may be defined as a number of pixels, inches, millimeters, etc.

In step 703, the width required per column $w_r$ is calculated for each property. The width required per column $w_r$ is the width required to display the characters for a given property. For example, in a date field with the format mm/dd/yyyy, the width required for that property is the number of pixels (or inches or millimeters) required to display ten characters, or in a gender field with the options "male" or "female," the width required is the number of pixels required to display six characters. The required width may be determined based upon the length of the longest data value actually present for a property in an existing entity. For example, if the entries in a gender property are all "male," then the width required is the number of pixels need to display just four characters. In other embodiments, the required width may be the longest possible value for a property whether or not the longest value is actually present. Using the previous example, where all entries in a gender property are "male," then the width required may be the number of pixels need to display six characters even if "female" never appears in the column.

In step 704, a default width $w_a$ of the columns to be displayed is calculated. The default width may be calculated as:

$$w_a = t/n \qquad \text{(Eq. 1)}$$

In step 705, a decision is made to determine if the width required $w_r$ for any of the columns is less than the default width $w_a$. If no column requires less space than the default width, then in step 706, the remaining columns are all assigned to the default width or to a percentage of the remaining available width. For example, the remaining columns may be distributed evenly or based on their relative size. As much data may be shown in each cell as fits within the default width assigned in step 706.

If one or more columns require less space than the default width, then in step 707, a group of columns are designated as group d where each column x in group d satisfies the requirement:

$$w_{rx} < w_a \qquad \text{(Eq. 2)}$$

The columns in group d require less space than the default column width. Accordingly, if the column was assigned the default width, space would be wasted. Instead, in step 708, the width of each column x in group d is set to the width required for that column:

$$W_{dx} = w_{rx} \qquad \text{(Eq. 3)}$$

In this way, each column in group d is allocated only the space required, which allows the excess space from group d to be redistributed to the other columns that required as much or more than the initial default column width.

In step 709, the total remaining width t on the display is calculated. This is equal to the initial width less the widths assigned to each of the columns in group d or:

$$t=t-(w_{d1}+w_{d2}+\ldots+w_{dm}) \quad \text{(Eq. 4)}$$

where there were m columns in the initial group d.

In step 710, the remaining number of columns n to be displayed is determined. This is equal to the initial number of columns less the number m of columns in group d or:

$$n=n-m \quad \text{(Eq. 5)}$$

The process then returns to step 704 and, using the updated values oft and n, steps 704-710 are repeated as necessary to redistribute the remaining display space to the columns.

The following example may be used to illustrate the width optimization process described above. A table includes four columns with properties that require (i.e., $w_{rx}$) 200, 250, 300 and 400 pixels, respectively, and the available display area (i.e., t) is 1000 pixels.

In this case, the number of columns to be displayed is four, so n=4. The default width is determined as: $w_a$=t/n=1000/4=250 pixels.

Analyzing the required widths ($w_{rx}$) for each property, it is observed that the first column ($w_{r1}$=200) meets the test $w_{rx}<w_a$. Accordingly, column 1 is designated as group d and the width for column 1 is set to the required width $w_{r1}$=200 pixels.

The total remaining width available on the display is now t=1000−200=800 pixels and there are three remaining columns.

The default width for the remaining columns is determined as: $w_a$=t/n=800/3=266 pixels. Analyzing the required widths ($w_{rx}$) for each remaining property, it is observed that the second column ($w_{r2}$=250) meets the test $w_{rx}<w_a$. Accordingly, column 2 is designated as group d and the width for column 2 is set to the required width: $w_{r2}$=250 pixels.

The total remaining width available on the display is now t=1000−200−250=550 pixels and there are two remaining columns.

The default width for the remaining columns is determined as: $w_a$=t/n=550/2=275 pixels. Analyzing the required widths ($w_{rx}$) for each remaining property, it is observed that no column meets the test $w_{rx}<w_a$. Accordingly, the widths for both remaining columns 3 and 4 are set to the default width: $w_{r3}$, $w_{r4}$, =275 pixels.

In this way, the unneeded width that would have been used by column 1 has been redistributed to columns 3 and 4.

Figure 8:
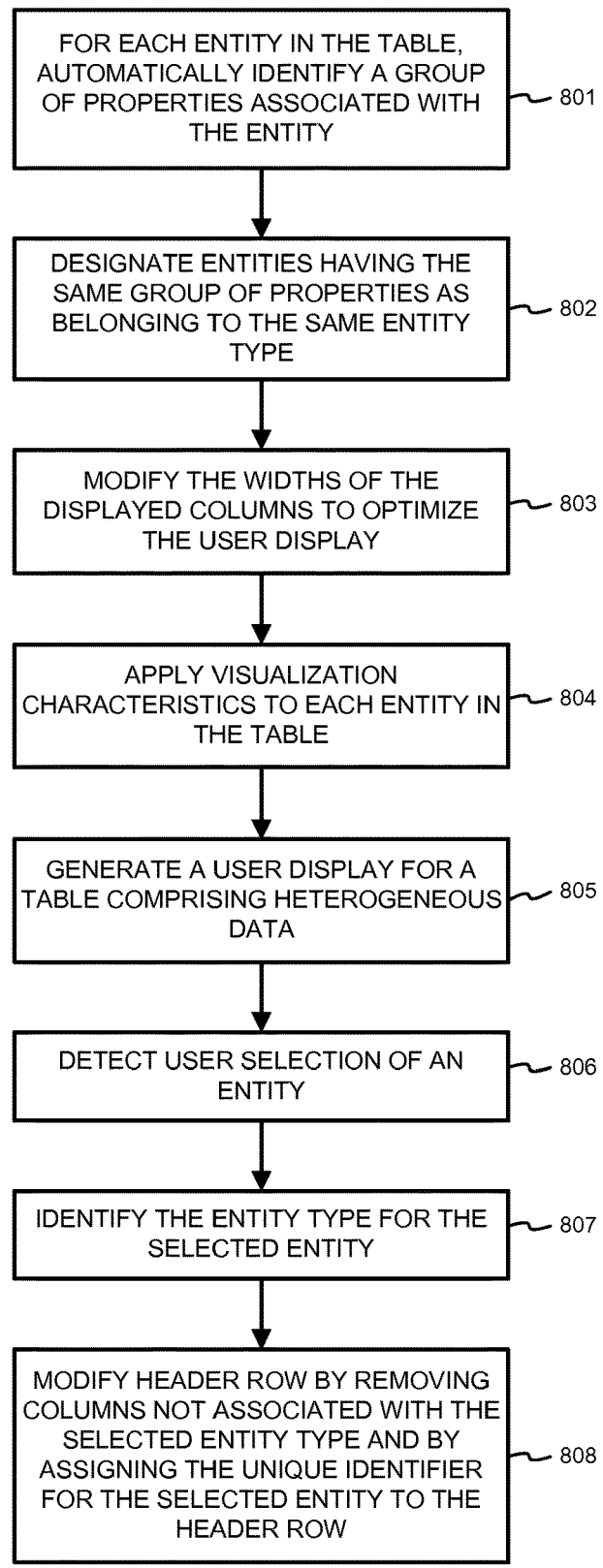
FIG. 8 is a flowchart illustrating a process or method for displaying a table to user according to one embodiment.

FIG. 8 is a flowchart illustrating a process or method for displaying information to a user in a viewer/editor according to one embodiment. In step 801, for each entity or row in the table, the detector automatically identifies a group of properties associated with the entity. These properties are identified by determining which columns hold data for the entity. In step 802, entities having a same group of associated properties are designated as belonging to the same entity type. A unique identifier may be automatically assigned to each entity type. The unique identifier may be a color, font, highlight, border, shading, or any other unique display feature or characteristic. In step 803, the column widths for the displayed properties are modified to optimize the user display. For example, the column widths may be modified as described in FIG. 7.

In step 804, one or more visualization characteristics are applied to each entity in the table. For example, an entity type property (312) may be assigned to each row in the table and/or each row may be highlighted or shown in a color assigned to the associated entity type.

In step 805, a user display is generated for a table comprising heterogeneous data. The table may be, for example, a NoSQL or schema-less table. In step 806, a user selection of an entity is detected. The entity type for the selected entity is identified in step 807. In step 808, the header row is modified by removing the properties that are not associated with the selected entity type and assigning the unique identifier for the selected entity type to the header row.

It will be understood that steps 701-710 of the process illustrated in FIG. 7 and steps 801-808 of the process illustrated in FIG. 8 may be executed simultaneously and/or sequentially. It will be further understood that each step may be performed in any order and may be performed once or repetitiously. Additional steps may also be incorporated in the methods.

Figure 9:
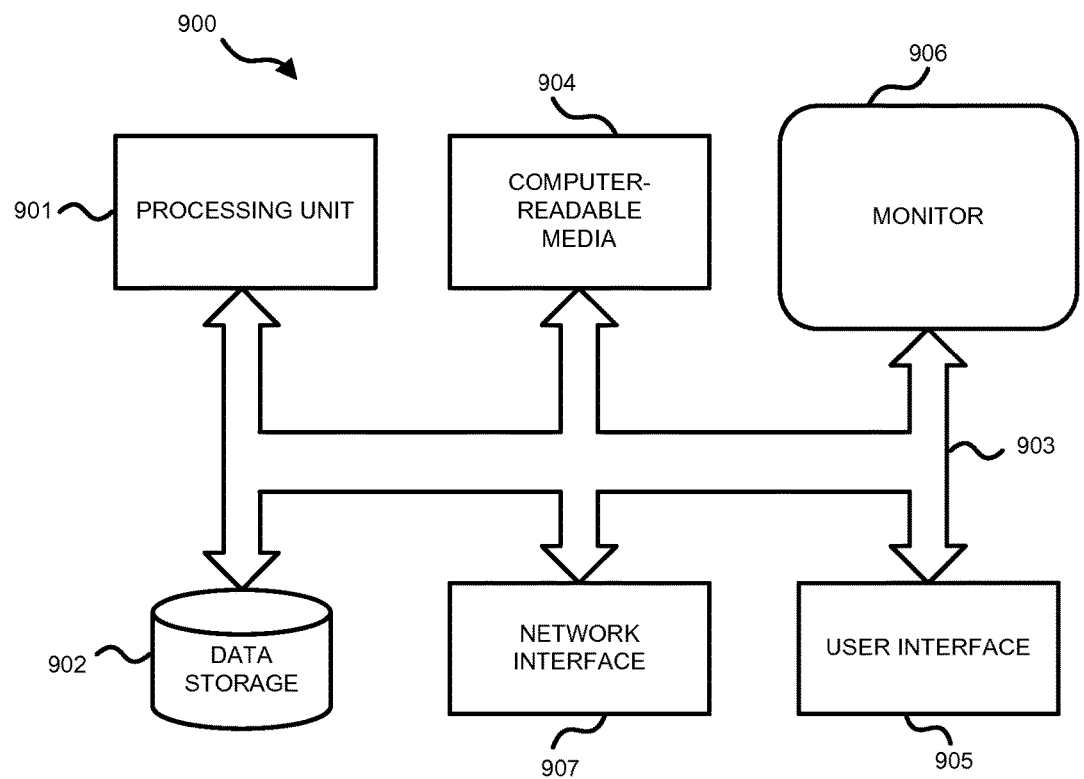
FIG. 9 illustrates an example of a suitable computing and networking environment for a schema-less data viewer/editor.

FIG. 9 illustrates an example of a suitable computing and networking environment 900 on which the examples of FIGS. 1-8 may be implemented. The computing system environment 900 is only one example of a suitable computing environment for providing a viewer/editor for schema-less data and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an exemplary system for implementing various aspects of the invention may include a general purpose computing device in the form of a computer 900. Components may include, but are not limited to, various hardware components, such as processing unit 901, data storage 902, such as a system memory, and system bus 903 that couples various system components including the data storage 902 to the processing unit 901. The system bus 903 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 900 typically includes a variety of computer-readable media 904. Computer-readable media 904 may be any available media that can be accessed by the computer 900 and includes both volatile and nonvolatile media, and removable and non-removable media, but excludes propagated signals. By way of example, and not limitation, computer-readable media 904 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 900. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 902 includes computer storage media in the form of volatile and/or nonvolatile memory such as read only memory (ROM) and random access memory (RAM). A basic input/output system (BIOS), containing the basic routines that help to transfer information between elements within computer 900, such as during start-up, is typically stored in ROM. RAM typically contains data and/or program modules that are immediately accessible to and/or presently being operated on by processing unit 901. By way of example, and not limitation, data storage 902 holds an operating system, application programs, and other program modules and program data.

Data storage 902 may also include other removable/non-removable, volatile/nonvolatile computer storage media. By way of example only, data storage 902 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 9, provide storage of computer-readable instructions, data structures, program modules and other data for the computer 900.

A user may enter commands and information through a user interface 905 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 901 through a user input interface 905 that is coupled to the system bus 903, but may be connected by other interface and bus structures, such as a parallel port, game port or a universal serial bus (USB). A monitor 906 or other type of display device is also connected to the system bus 903 via an interface, such as a video interface. The monitor 906 may also be integrated with a touch-screen panel or the like. Note that the monitor and/or touch screen panel can be physically coupled to a housing in which the computing device 900 is incorporated, such as in a tablet-type personal computer. In addition, computers such as the computing device 900 may also include other peripheral output devices such as speakers and printer, which may be connected through an output peripheral interface or the like.

The computer 900 may operate in a networked or cloud-computing environment using logical connections 907 to one or more remote devices, such as a remote computer. The remote computer may be a personal computer, a server, a router, a network PC, a peer device or other common network node, and typically includes many or all of the elements described above relative to the computer 900. The logical connections depicted in FIG. 9 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 900 may be connected to a public or private network through a network interface or adapter 907. In some embodiments, a modem or other means for establishing communications over the network. The modem, which may be internal or external, may be connected to the system bus 903 via the network interface 907 or other appropriate mechanism. A wireless networking component such as comprising an interface and antenna may be coupled through a suitable device such as an access point or peer computer to a network. In a networked environment, program modules depicted relative to the computer 900, or portions thereof, may be stored in the remote memory storage device. It may be appreciated that the network connections shown are exemplary and other means of establishing a communications link between the computers may be used. Additional data storage, such as cloud-based storage, may be accessed via network interface 907.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for automatically optimizing a display of heterogeneous textual data that is being displayed in a user interface comprising a schema-less table, the method comprising:

displaying, on a screen of a computer system implementing the method, the schema-less table comprising the heterogeneous textual data in a first format, wherein the first format of the schema-less table includes a number of columns and a number of rows;

for each particular row in the schema-less table, identifying a corresponding group of columns associated with each particular row, wherein:

the corresponding group of columns associated with each particular row is less than the number of columns in the schema-less table, and determining whether a particular column is associated with a particular row is dependent on a presence or absence of a cell value for a common cell that is common between the particular column and the particular row, the presence of the cell value in the common cell indicates that the particular column is associated with the particular column is not associated with the particular row;

automatically designating an entity type for each row in the schema-less table, wherein determining which entity type is designated for each row is based on the identified associations between the columns and the rows such that any rows associated with a same set of columns are designated as being of a same entity type;

monitoring the schema-less table, including any rows included within the schema-less table, to detect user selection of a first-entity-type row in the schema-less table, the first-entity-type row having been automatically designated as belonging to a first entity type;

in response to the user selection of the first-entity-type row, automatically rearranging the schema-less table, by one or more processors of the computer system, to display the first-entity-type row and any other rows designated as being of the first entity type in a compressed format so that cell values for at least a majority of cells included within the first-entity-type row and the other rows designated as being of the first entity type are viewable on the computer system's screen by a user of the computer system, the compressed format being a format where blank columns are collapsed such that blank columns are refrained from being displayed; and automatically returning the schema-less table, by the one or more processors, to the first format when one or more rows are no longer selected.

2. The computer-implemented method of claim 1, further comprising:

assigning a unique identifier to each entity type; and displaying the unique identifier associated with the first entity type;

wherein the unique identifier is selected from the group consisting of a color, font, highlight, border, shading, label, icon, or shape.

3. The computer-implemented method of claim 2, wherein the unique identifier is a unique display feature or characteristic.

4. The computer-implemented method of claim 1, wherein displaying the first-entity-type row and the any other rows in the compressed format also causes widths of any displayed columns to be modified.

5. The computer-implemented method of claim 1, further comprising:

when the first-entity-type row and the any other rows are displayed in the compressed format, refraining from displaying column headings for columns that are not associated with the first entity type.

6. The computer-implemented method of claim 5, wherein an available display space is larger than a user-viewable space.

7. The computer-implemented method of claim 6, further comprising:

identifying a default column width for columns associated with the first entity type, the default column width determined by a size of a table display area and a number of columns to display.

8. The computer-implemented method of claim 1, wherein a designation of a new entity type, which includes at least some similar properties to an existing entity type, causes an alert to be raised, the alert indicating a possible presence of a data collection problem in which certain data should be present in the schema-less table but is not present.

9. The computer-implemented method of claim 1, wherein rows of differing entity types are displayed in different colors.

10. A system for automatically optimizing a display of heterogeneous textual data that is being displayed in a schema-less table, the system comprising:

a processor; and a memory coupled to the processor, the memory storing computer-readable instructions that are executable by the processor to cause the system to:

display, on a screen of the system, the schema-less table comprising the heterogeneous textual data in a fist format, wherein the first format of the schema-less table includes a number of columns and a number of rows;

for each particular row in the schema-less table, identify a corresponding group of columns associated with each particular row, wherein:

the corresponding group of columns associated with each particular row is less than the number of columns in the schema-less table, and determining whether a particular column is associated with a particular row is dependent on a presence or absence of a cell value for a common cell that is common between the particular column and the particular row, the presence of the cell value in the common cell indicates that the particular column is associated with the particular row while the absence of the cell value in the common cell indicates that the particular column is not associated with the particular row;

automatically designate an entity type for each row in the schema-less table, wherein determining which entity type is designated for each row is based on the identified associations between the columns and the rows such that any rows associated with a same set of columns are designated as being of a same entity type;

monitor the schema-less table, including any rows included within the schema-less table, to detect user selection of a first-entity-type row in the schema-less table, the first-entity-type row having been automatically designated as belonging to a first entity type:

in response to the user selection of the first-entity-type row, automatically rearrange the schema-less table, by the processor of the system, to display the first-entity-type row and any other rows designated as being of the first entity type in a compressed format so that cell values for at least a majority of cells included within the first-entity-type row and the other rows designated as being of the first entity type are viewable on the system's screen by a user of the system, the compressed format being a format where blank columns are collapsed such that blank columns are refrained from being displayed; and automatically return the schema-less table, by the processor, to the first format when one or more rows are no longer selected.

11. The system of claim 10, wherein the computer-readable instructions further cause the system to:

assign a unique identifier to each entity type; and display the unique identifier associated with the first entity type;

wherein the unique identifier is selected from the group consisting of a color, font, highlight, border, shading, label, icon, or shape.

12. The system of claim 11, wherein the unique identifier is a unique display feature or characteristic.

13. The system of claim 10, wherein displaying the first-entity-type row and the any other rows in the compressed format also causes widths of any displayed columns to be modified.

14. The system of claim 10, wherein, when the first-entity-type row and the any other rows are displayed in the compressed format, column headings for columns that are not associated with the first entity type are refrained from being displayed.

15. The system of claim 14, wherein an available display space is larger than a user-viewable space.

16. The system of claim 15, the memory storing additional computer-readable instructions that, upon execution by the processor, cause the system to:

identify a default column width for columns associated with the first entity type, the default column width determined by a size of a table display area and a number of columns to display.

17. One or more hardware storage devices having stored thereon computer-executable instructions that are executable by one or more processors of a computer system to cause the computer system to automatically optimize a display of heterogeneous textual data that is being displayed in a user interface comprising a schema-less table by causing the computer system to:

display, on a screen of the computer system, the schema-less table comprising the heterogeneous textual data in a first format, wherein the first format of the schema-less table includes a number of columns and a number of rows;

for each particular row in the schema-less table, identify a corresponding group of columns associated with each particular row, wherein:

the corresponding group of columns associated with each particular row is less than the number of columns in the schema-less table, and determining whether a particular column is associated with a particular row is dependent on a presence or absence of a cell value for a common cell that is common between the particular column and the particular row, the presence of the cell value in the common cell indicates that the particular column is associated with the particular row while the absence of the cell value in the common cell indicates that the particular column is not associated with the particular row;

automatically designate an entity type for each row in the schema-less table, wherein determining which entity type is designated for each row is based on the identified associations between the columns and the rows such that any rows associated with a same set of columns are designated as being of a same entity type;

monitor the schema-less table, including any rows included within the schema-less table, to detect user selection of a first-entity-type row in the schema-less table, the first-entity-type row having been automatically designated as belonging to a first entity type;

in response to the user selection of the first-entity-type row, automatically rearrange the schema-less table, by the one or more processors of the computer system, to display the first-entity-type row and any other rows designated as being of the first entity type in a compressed format so that cell values for at least a majority of cells included within the first-entity-type row and the other rows designated as being of the first entity type are viewable on the computer system's screen by a user of the computer system, the compressed format being a format where blank columns are collapsed such that blank columns are refrained from being displayed; and automatically return the schema-less table, by the one or more processors, to the first format when one or more rows are no longer selected.

* * * * *